(12) United States Patent  
Peek

(10) Patent No.: US 9,380,904 B2
(45) Date of Patent: Jul. 5, 2016

(54) TELESCOPING COMPASS DEVICE

(71) Applicant: Shane E. Peek, Alpharetta, GA (US)

(72) Inventor: Shane E. Peek, Alpharetta, GA (US)

( * ) Notice: Subject to any disclaimer, the term of this patent is extended or adjusted under 35 U.S.C. 154(b) by 0 days.

(21) Appl. No.: 14/740,614

(22) Filed: Jun. 16, 2015

(65) Prior Publication Data

US 2015/0366391 A1  Dec. 24, 2015

Related U.S. Application Data

(60) Provisional application No. 62/013,641, filed on Jun. 18, 2014.

(51) Int. Cl.
*A47G 33/00* (2006.01)
*G01C 17/00* (2006.01)
*F16M 11/28* (2006.01)

(52) U.S. Cl.
CPC ............. *A47G 33/008* (2013.01); *F16M 11/28* (2013.01); *G01C 17/00* (2013.01)

(58) Field of Classification Search
CPC ....... A47G 33/008; F16M 11/00; G01C 17/00
USPC .............. 248/150, 125.8, 166, 170, 171, 165, 248/176.1, 177.1, 159, 157
See application file for complete search history.

(56) References Cited

U.S. PATENT DOCUMENTS

| | | | | |
|---|---|---|---|---|
| 3,064,932 A | * | 11/1962 | Holderman | F16M 11/28 248/171 |
| 4,121,799 A | * | 10/1978 | Michio | F16M 11/34 248/171 |
| 4,915,332 A | * | 4/1990 | Ouellette | F16M 11/20 211/172 |
| 5,137,236 A | * | 8/1992 | Burns | B41J 29/06 248/169 |
| 5,222,705 A | | 6/1993 | Gibran et al. | |
| 5,384,609 A | | 1/1995 | Ogawa et al. | |
| 5,421,549 A | * | 6/1995 | Richards | F16M 11/20 248/163.2 |
| 7,111,424 B1 | * | 9/2006 | Moody | F41A 23/08 248/171 |
| 7,508,316 B1 | * | 3/2009 | Arrar | A47G 27/0237 340/502 |
| 8,651,438 B2 | * | 2/2014 | Deighton | F16M 11/28 248/163.1 |
| 2013/0027901 A1 | | 1/2013 | Martin et al. | |
| 2013/0048802 A1 | * | 2/2013 | Guran | F16M 11/041 248/122.1 |

FOREIGN PATENT DOCUMENTS

WO  2013/083982 A1  6/2013

\* cited by examiner

*Primary Examiner* — Anita M King
(74) *Attorney, Agent, or Firm* — Maier & Maier, PLLC

(57) ABSTRACT

An integrated prayer support apparatus that may serve as a Sutrah, or symbolic partition. The apparatus is self-contained, lightweight, and highly mobile. The apparatus includes of a body with an open upper end and a closed lower end. A extendable rod such that the extendable rod may extend away from the lower body and out of the open upper end of the body in telescopic fashion. The extendable rod may have an instrument fixed to it for the purpose of identifying the location towards Mecca, Saudi Arabia. Support legs in a tripod orientation may stabilize the apparatus. The body may have an attachment device, such as a carabineer, keychain or hook. Additionally, the instrument and other elements may glow in the dark by using radioactive materials or may be electronically illuminated.

10 Claims, 5 Drawing Sheets

TELESCOPING COMPASS DEVICE

CROSS-REFERENCE TO RELATED APPLICATIONS

This application claims priority to U.S. Provisional Patent Application No. 62/013,641 filed: Jun. 18, 2014, and entitled Sutrah-Muslim Prayer Item, the entire contents of which are hereby incorporated by reference.

BACKGROUND

A Sutrah is an object that is used by a person performing Salat as a barrier between himself and one passing in front of him. Salat is the practice of physical prayer for the religion of Islam. The most important obligatory ritual for all Muslims is the Salah, which is the five daily prayers that all Muslims are required to pray each day. Traditionally, a Sutrah is placed in front of a praying individual and serves as a symbolic barrier between that individual and anyone passing in front of that individual. Traditionally, the person praying should be positioned at less than or equal to three forearms' length away from the Sutrah. The Sutrah's height must be no less than one forearm's length, whereas its width has no stipulated size.

Muslims that carry out the five daily prayers must use a Sutrah while facing Mecca, Saudi Arabia. Muslims are often forced to use inanimate objects around them such as trees, walls, cars etc. as a Sutrah to carry out the five daily prayers. The use of these inanimate objects may be problematic for Muslims that must frequently travel. Because the Sutrah is an obligatory practice of the Muslim religion, which consists of over two billion people worldwide, many individuals would benefit from a travel friendly Sutrah.

SUMMARY

According to an exemplary embodiment, an integrated prayer support apparatus is disclosed. The apparatus may include a body with an open upper end and a closed lower end. A extendable rod may be coupled to the lower end of the body such that the extendable rod may extend away from the lower body and out of the open upper end of the body. A stop ring, may be located inside of the body to help stabilize the extendable rod within the body and to stop the sliding leg ring at a pre-determined location. The sliding leg ring may be coupled to at least one leg by a pivotable connection. The sliding leg ring may slide up and down the extendable rod between the supporting ring and the closed portion of the body. When the sliding ring is positioned closest to the closed portion of the body the legs may be deployed outside of the body as stabilizers. When the sliding ring is positioned closest to the open end of the body, the legs may be substantially stored within the body. When deployed the legs extend out from the body and stabilizes the unit. When stored, the legs are contained within the body and are not visible. The stop ring may be temporarily coupled to the leg ring for storage or travel. An instrument nest may be coupled to the extendable rod.

BRIEF DESCRIPTION OF THE FIGURES

Advantages of embodiments of the present invention will be apparent from the following detailed description of the exemplary embodiments. The following detailed description should be considered in conjunction with the accompanying figures in which:

Exemplary FIG. 1 may show a schematic view of the collapsed position of the apparatus;

Figure 2A:
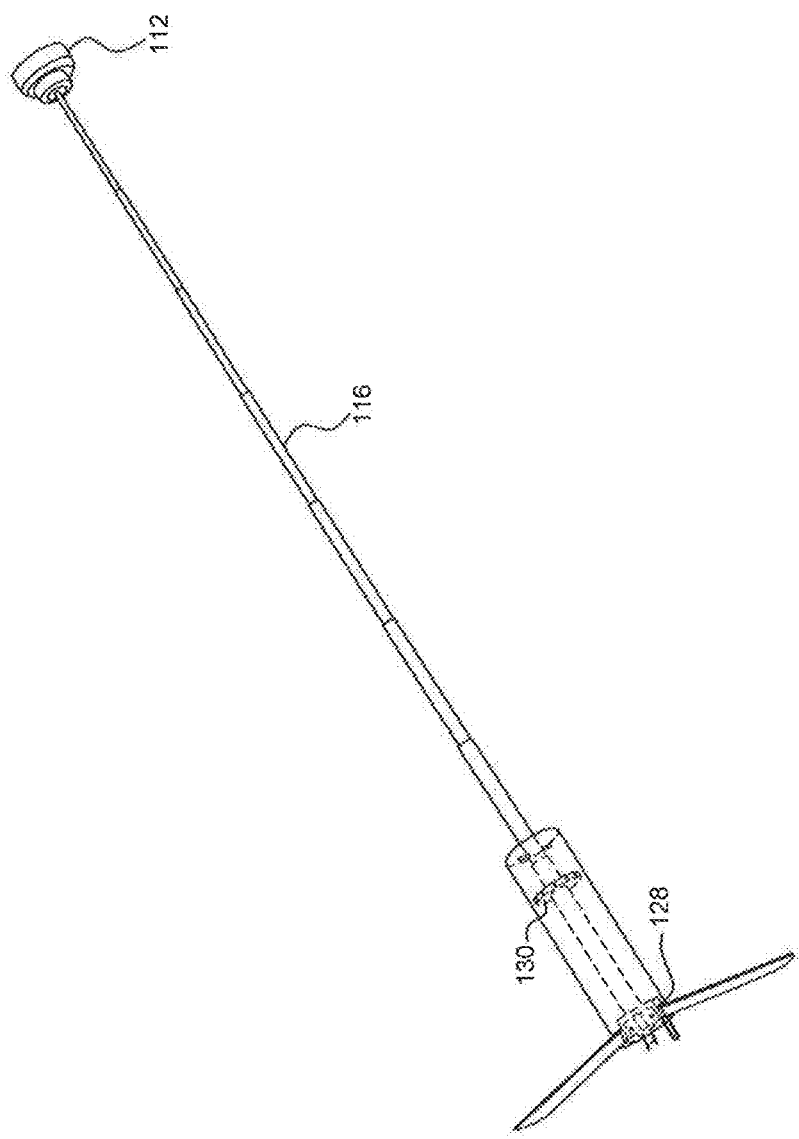
Figure 2B:
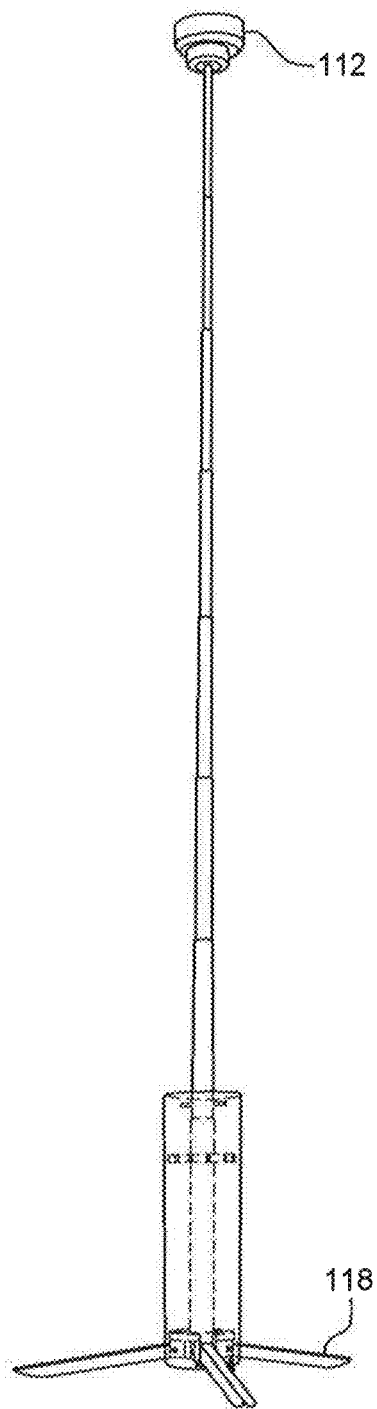
Figure 3:
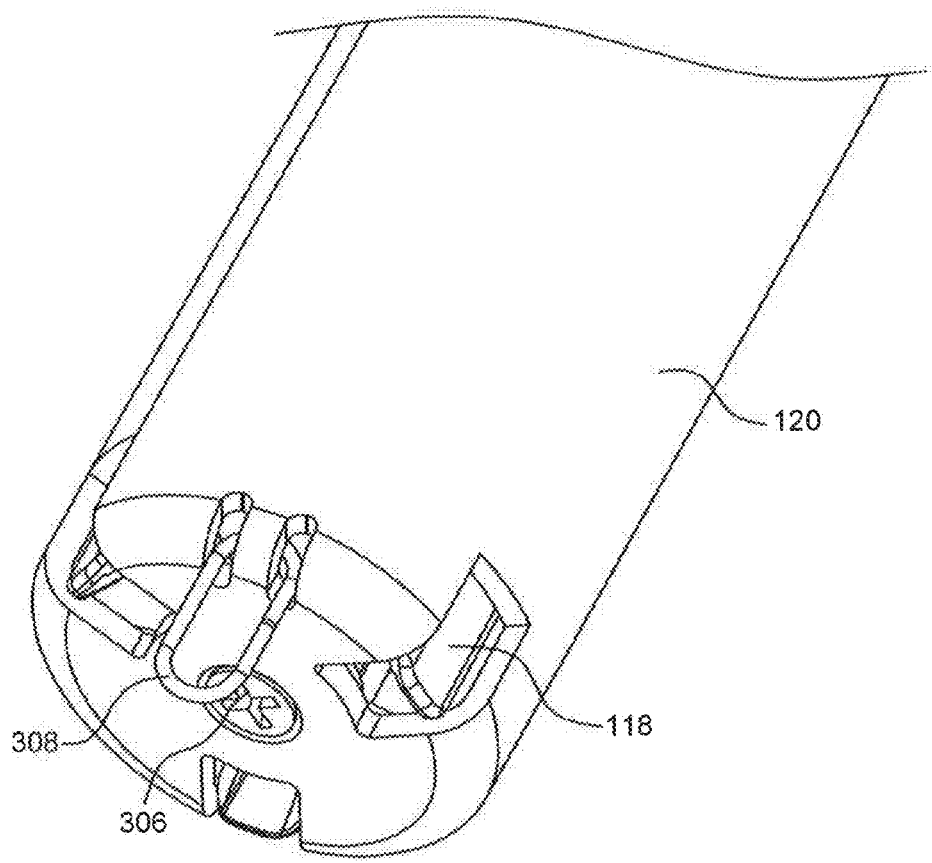
Figure 4:
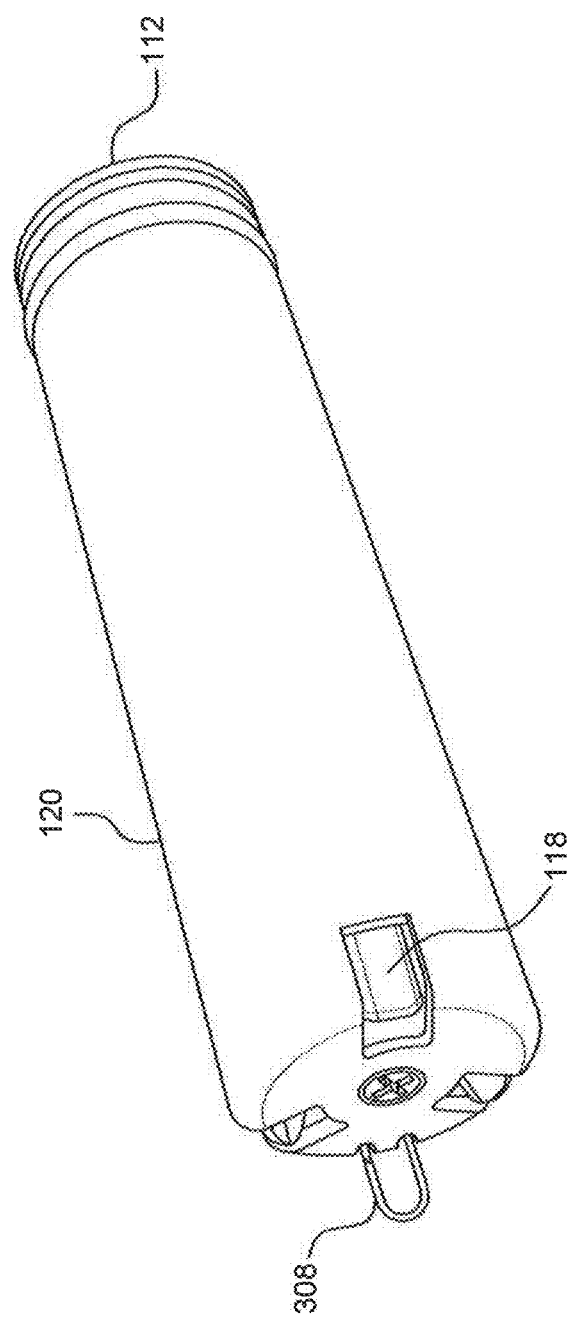

Exemplary FIG. 2A may show an exploded view of the extended position of the apparatus;

Exemplary FIG. 2B may show an alternate exploded view of the extended position;

Exemplary FIG. 3 may show a collapsed view of the apparatus;

Exemplary FIG. 4 may show a profile view of the apparatus when collapsed;

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

According to at least one exemplary embodiment and referring to the Figures generally, an integrated prayer support apparatus may be disclosed. The apparatus may include; a body with an open upper end 123 and a substantially closed lower end 121 that houses a extendable rod 116. The extendable rod 116 may be coupled to the lower end of the body by a fastener, such as a screw or similar fastener as would be understood by a person having ordinary skill in the art. Alternatively, the extendable rod 116 may be affixed to another portion of the body or a member within the body. The extendable rod may be coupled to the stop ring 130. Additionally, a stop ring 130 may be located inside of the body and may be attached to the extendable rod. The stop ring 130 may assist with stabilization by bracing against the inside of the body. An instrument nest 112, or unit to house a compass or other instrument 110, may be attached to the extendable rod 116 by a secured connection and the instrument nest 112 may be outside of the upper end of the body. The apparatus may be supported by at least one support leg 118 that may extend out of the base of the body. The at least one support leg 118 may be coupled to a leg ring 128 that may slide along the extendable rod between the stop ring 130 and substantially closed end of the body. The at least one support leg 118 may be attached to the leg ring 128 by a pivotable connection such as a pin, ball joint, or similar connection as would be understood by a person having ordinary skill in the art. The at least one support leg 118 may optionally have a notch on the tip of the leg, which may slightly stick out from the base of the apparatus. In some exemplary embodiments, the leg ring 128 and at least one support leg 118 may be released by a push button system. In at least one exemplary embodiment, a compass or other instrument may be housed within the instrument nest 112. Further, the instrument may be capable of glowing in the dark. An instrument may be capable of glowing in the dark through the use of radioactive phosphorescent materials or other materials and mechanisms as would be understood by a person having ordinary skill in the art.

Figure 1:
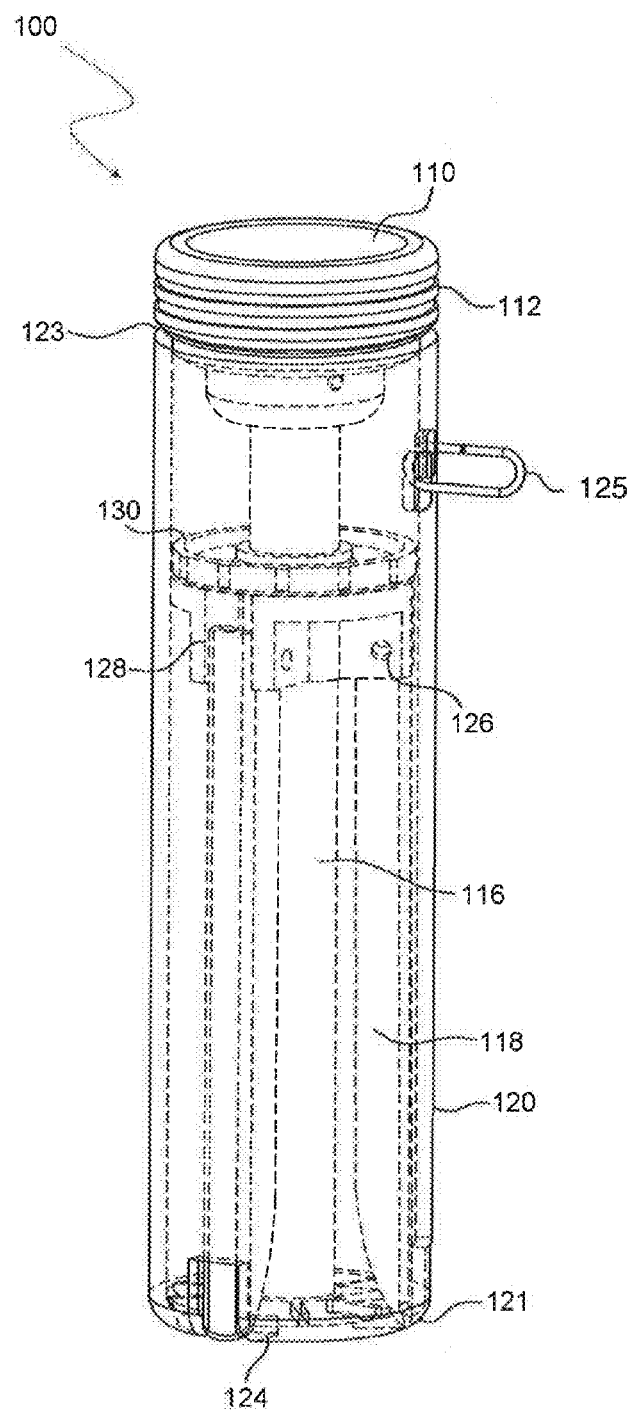

Referring to the figures generally, and exemplary FIG. 1 specifically, an integrated prayer support 100 may be provided. An exemplary integrated prayer support may include a body 120, which may have a substantially closed bottom 121 and an open end 123. The body may be cylindrical in shape. The closed bottom 121 may have openings for at least one support leg 118. The body may further have an internal storage compartment 124 for toiletries. Additionally, the body may have an attachment device 125 coupled to it. The attachment device 125 may be attached to the body of the device near the substantially open end of the device. Alternatively an attachment device 125 may be coupled to the body at an alternate location. The attachment device 125 may be schematically shown as a carabineer, but it may be contemplated for the attachment device to encompass a broad variety of elements such as buckles, straps, key rings and other elements generally used for the attachment of portable items. The attachment device 125 may be coupled to the apparatus at any feasible location. The body 120 may include at least one securing portion for affixing an attachment device.

In some exemplary embodiments, the extendable rod 116 may be coupled to the body at the closed bottom 121. The extendable rod 116 may be coupled to the closed bottom 121 by a retaining element such that the extendable rod is fixed to the body in at least one location. The extendable rod 116 may be a telescoping rod. Further, the extendable rod 116 may have any desired cross-sectional shape. Further, the extendable rod 116 of a prayer support may come in a variety of lengths, as desired.

The extendable rod 116 may be supported in place by a stop ring 130. In some exemplary embodiments, the extendable rod 116 may further be secured by a retaining element or other similar retaining device such as a screw. The stop ring 130 may also serve the function of a physical barrier to stop the slide-able leg ring 128 at a pre-determined location. The stop ring 130 may be a material that braces against the interior walls of the body 120, and the exterior of the extendable rod 116. The stop ring 130 may alternately be configured in any shape such that it provides support for the extendable rod by bracing against the interior of the body 120.

The extendable rod 116 may be secured to the instrument nest 112 by a pin or similar connection such that they are effectively coupled together. In an exemplary embodiment, the extendable rod and instrument nest may optionally be pivotably coupled. The instrument nest 112 may serve at least two functions. For example, a first function may nest an instrument, by housing it within its interior such that the instrument face is visible. The instrument 110 may be any desired instrument, such as a compass or watch. Further, the instrument may comprise radioactive materials, such as phosphorescent paints, such that these materials illuminate the instrument in low lighting conditions. A second function of the instrument nest may provide a closure for the upper end of the body. The upper end of the body may be open to allow the extendable rod to extend upwards through the opening. When the extendable rod is fully collapsed the instrument nest 112 and the instrument within the nest 110 may effectively serve as a closure for the open end 123.

The leg ring 128 may slide up and down the extendable rod 116 between the stop ring 130 and the closed end of the body 120. The leg ring 128 may attach to a leg 118 in at least one location by a pivotable connection 126 such as a pin or ball joint. The pivotable connection may alternately be designed to incorporate a tension spring that may secure the leg 118 to the leg ring 128 when extended. The sliding leg ring 128 may slide towards the closed end of the body 120 thereby allowing the leg 118 to extend away from the body 120. The leg ring may be held in place by a push button system. The push button may be used to release the leg ring from a pre-determined location. The push button may be a pin system that holds the leg ring in place between the stop ring and the pin system. Alternatively, the push button may be a track system that allows the leg ring to slide up and down, as the button is slid along the track, thereby extending the leg 118 as would be understood by a person having ordinary skill in the art. The at least one leg 118 may be used to stabilize the entire unit by providing a secure base position. The at least one leg 118 may be used to set up the device in the shape of a tripod or other alternate configuration such that the at least one leg 118 may assist with the stabilization of the device. The at least one leg 118 may have a notch to assist the user with pulling the at least one leg out. The at least one leg 118 may additionally be released via a pushbutton, located on the base of the apparatus. The body may have an internal storage compartment, such that the internal storage compartment may retain a toiletry item 124 such as a fragrance. The internal storage compartment and the toiletry item 124 may be located at the base of the apparatus. Alternatively, the internal storage compartment and the toiletry item 124 may be located at any convenient location of the apparatus. The toiletry item may be a dram that can house essential oils or fragrances. The prayer support 100 may include metal, wood, plastics, rubber, ceramics, glass, polymers and any other desired material. This device is envisioned to be composed of varying types of materials such that various unique customizations may be created. Further, the device is contemplated for at least one of any of the aforementioned items to be coated or comprise of phosphorescent material.

Referring generally to FIG. 2A and FIG. 2B, the prayer support may be shown in an extended state. The extendable rod 116 may be fully extended, in telescopic fashion. The instrument and nest 112 may be permanently attached to the farthest extremity of the extendable rod 116. The stop ring 130 may be installed in a pre-determined fixed location. The leg ring 128 may be shown at the farthest extremity away from the stop ring 130. By extending the leg ring to this position the at least one leg 118 may be able to fully extend and stabilize the device.

Referring generally to FIG. 3, the base of the body 120 may be shown. There may be small openings within the body that allow for the at least one leg 118 to move freely in and out of the body. In an exemplary embodiment, the at least one leg 118 may be pulled from the body or may be ejected as the leg ring slides toward the base. In embodiments having multiple legs, the leg ring may cause the legs to eject from the body in unison. In some exemplary embodiments, the extendable rod, shown in FIG. 2A and FIG. 2B, may be secured in place by a retaining element, such as a screw 306. The retaining element may be contemplated to be any element capable of securing the extendable rod to the body 120 of the device. Furthermore, an attachment device 308 may be shown coupled to a securing portion affixed to or integrally formed in the body of the device. The body of the device may be further arranged to allow for various types and styles of attachment devices in various locations. The exemplary attachment device 308 as shown, may be a carabineer and may be a representative, but non-limiting example of an attachment. In some exemplary embodiments, an engravable plate may be affixed to the body. The engravable plate may allow for emergency information or other types of information to be coupled to the body of the device. Additionally, the body may further include an illuminating device, such as a flashlight.

Referring generally to FIG. 4, an exemplary prayer support may be shown in its fully collapsed state. The at least one leg 118 may be shown in a collapsed state, retracted within the body 120 and may be seen slightly protruding through the small openings on the closed side of the body 120. The instrument nest 112 may also be shown in the retracted position where it may effectively serve as a closure for the top of the device. The attachment device 308 may additionally be shown on the closed end of the device. In alternative exemplary embodiments, the attachment device 308 may be affixed proximate the open end of the body. This may allow the prayer support to be hung in a substantially upright orientation.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An integrated prayer support apparatus comprising:
   a body, the body having an open upper end and a closed lower end;
   a extendable rod, the extendable rod disposed within the body and configured to extend through the open upper end;
   a stop ring inside of the body, the stop ring bracing the extendable rod against an interior wall of the body;
   an instrument nest affixed to an end of the extendable rod outside of the open upper end of the body;
   at least one support leg pivotably connected to a leg ring, wherein the leg ring is configured to slide along the extendable rod between the stop ring and the closed lower end of the body; and
   an instrument coupled to the instrument nest.

2. The apparatus of claim 1, wherein the at least one support leg further comprises a notch at the outermost edge.

3. The apparatus of claim 1, wherein the body, extendable rod, at least one support leg, instrument nest, or instrument further comprises phosphorescent material.

4. The apparatus of claim 1, wherein an attachment device is coupled to the body.

5. The apparatus of claim 1, further comprising an engravable plate coupled to the body.

6. The apparatus of claim 1, further comprising an illumination device affixed to the body.

7. The apparatus of claim 1, further comprising at least one spring coupled to the at least one support leg and the body.

8. The apparatus of claim 1, wherein the instrument is a compass.

9. The apparatus of claim 1, wherein the body, extendable rod, at least one support leg, instrument nest, or instrument further comprises at least one of metal, wood, plastics, rubber, ceramics, glass, and polymers.

10. The apparatus of claim 1, further comprising an internal storage compartment configured to house toiletries.

* * * * *